(12) United States Patent  (10) Patent No.: US 8,773,972 B2
Stirling-Gallacher et al.  (45) Date of Patent: Jul. 8, 2014

(54) TRANSMITTING DEVICE AND METHOD FOR TRANSMITTING SIGNALS IN A WIRELESS COMMUNICATION SYSTEM, RECEIVING DEVICE AND METHOD FOR RECEIVING SIGNALS IN A WIRELESS COMMUNICATION SYSTEM

(71) Applicant: Sony Deutschland GmbH, Berlin (DE)

(72) Inventors: Richard Stirling-Gallacher, Esslingen (DE); Zhaocheng Wang, Stuttgart (DE)

(73) Assignee: SONY DEUTSCHLAND GmbH, Berlin (DE)

( * ) Notice: Subject to any disclaimer, the term of this patent is extended or adjusted under 35 U.S.C. 154(b) by 0 days.

(21) Appl. No.: 13/686,463

(22) Filed: Nov. 27, 2012

(65) Prior Publication Data

US 2013/0084815 A1    Apr. 4, 2013

Related U.S. Application Data

(63) Continuation of application No. 12/041,181, filed on Mar. 3, 2008, now Pat. No. 8,345,532.

(30) Foreign Application Priority Data

Mar. 16, 2007 (EP) ..................... 07104353

(51) Int. Cl.
*H04J 11/00* (2006.01)
(52) U.S. Cl.
USPC ........... 370/208; 370/335; 370/329; 370/330; 370/441; 370/334; 370/435
(58) Field of Classification Search
USPC ......................... 370/208, 335, 329
See application file for complete search history.

(56) References Cited

U.S. PATENT DOCUMENTS 6,473,593 B1  10/2002  Groff
6,639,939 B1 * 10/2003  Naden et al. .................. 375/140

(Continued)

FOREIGN PATENT DOCUMENTS

DE    103 32 324 A1   2/2005
EP    1 320 212 A2    6/2003

(Continued)

OTHER PUBLICATIONS

Dammann et al., IEEE Document Beamforming in Combination with Space Time Diversity for Broadband OFDM Systems, Feb. 2002, IEEE, pp. 165-171.*

(Continued)

*Primary Examiner* — Kwasi Karikari
*Assistant Examiner* — Randy Peaches
(74) *Attorney, Agent, or Firm* — Oblon, Spivak, McClelland, Maier & Neustadt, L.L.P.

(57) ABSTRACT

A transmitting device for transmitting signals carrying data in a wireless communication system, including at least two beam antennas, each beam antenna having a main beaming direction at a different angle; a generator configured to generate a number of signal streams to be transmitted over a wireless communication channel within the wireless communication system, wherein each of the signal streams includes a different version of the data and the number of signal streams corresponds to the number of the at least two beam antennas, wherein each signal stream is transmitted over the wireless communication channel via a different beam antenna of the at least two beam antennas; and a cyclic delay diversity unit configured to cyclically shift each different version of data and to use cyclic delay diversity.

20 Claims, 11 Drawing Sheets

(56) References Cited

U.S. PATENT DOCUMENTS

| | | |
|---|---|---|
| 7,020,445 B1 | 3/2006 | Miya |
| 7,046,617 B2 | 5/2006 | Rotstein et al. |
| 7,386,072 B2 | 6/2008 | Uno |
| 2005/0207333 A1 | 9/2005 | Rotstein et al. |
| 2006/0034382 A1 | 2/2006 | Ozluturk et al. |
| 2006/0256886 A1 | 11/2006 | Har et al. |
| 2007/0133426 A1* | 6/2007 | Chambers ............ 370/252 |

FOREIGN PATENT DOCUMENTS

| | | |
|---|---|---|
| EP | 1 635 481 | 3/2006 |
| EP | 1 689 109 A1 | 8/2006 |
| JP | 2001-111464 | 4/2001 |
| JP | 2003-514428 A | 4/2003 |
| JP | 2003-244054 A | 8/2003 |
| JP | 2003-333013 | 11/2003 |
| JP | 2004-72566 A | 3/2004 |
| JP | 2006-180339 A | 7/2006 |
| WO | WO 02/061878 A2 | 8/2002 |
| WO | WO 02/061878 A3 | 8/2002 |
| WO | WO 2006/020411 | 2/2006 |

OTHER PUBLICATIONS

Dammann A. et at: "Beamforming in Combination with Space-Time Diversity for Broadband OFDM Systems" 2002 IEEE International Conference on Communications. Conference Processings. New York, NY, Apr. 28-May 2, 2002, IEEE, US, vol. 1 of 5, Apr. 28, 2002, pp. 165-171.

Alamouti, S.M., "A Simple Transmit Diversity Technique for Wireless Communications" IEEE Journal on Select Areas in Communications, vol. 16, No. 8, Oct. 1998, pp. 1451-1458.

Dammann, A., et al., "Transmit/Receive-Antenna Diversity Techniques for OFDM Systems" Institute of Communications and Navigation, German Aerospace Center (DLR), vol. 13, No. 5., Sep./Oct. 2002, pp. 531-538.

Dammann, A., et al., "Standard Conformable Antenna Diversity Techniques for OFDM and its Application to the DVB-T System" Institute of Communications and Navigation, German Aerospace Center (DLR), 2001.

European Examination Report issued Oct. 6, 2010 in EP 07 104 353.3.

Japanese Office Action issued on May 1, 2012, in Japanese Patent Application No. 2008-068140 (with English-language Translation).

European Office Action mailed on Aug. 9, 2012, issued for EP Application No. 07 104 353.3-2411, filed on Mar. 16, 2007 (English).

IEEE document, Dammann et al.—Beamforming in Combination with Space-Time Diversity for Broadband OFDM Systems, May 2002, IEEE Document, pp. 165-171.

Office Action issued Jan. 15, 2013, in Japanese Patent Application No. 2008-068140 with English translation.

European Office Action dated Sep. 4, 2013, issued in European Patent Application No. 11 159 960.1.

Office Action issued May 14, 2013, in Japanese Patent Application No. 2008-068140.

* cited by examiner

Background Art

Background Art

Background Art

Fig. 12b

TRANSMITTING DEVICE AND METHOD FOR TRANSMITTING SIGNALS IN A WIRELESS COMMUNICATION SYSTEM, RECEIVING DEVICE AND METHOD FOR RECEIVING SIGNALS IN A WIRELESS COMMUNICATION SYSTEM

CROSS-REFERENCE TO RELATED APPLICATIONS

The present application is a continuation application of U.S. patent application Ser. No. 12/041,181, filed Mar. 3, 2008, the entire contents of which are incorporated herein by reference, and claims priority to European Patent Application No. 07 104 353.3, filed Mar. 16, 2007.

The present invention relates to a transmitting device and a method for transmitting signals in a wireless communication system as well as to a receiving device and a method for receiving signals in a wireless communication system, whereby for transmission and reception beam antennas are used.

Wireless communication is used in a large variety of technical fields, such as mobile telephone, wireless LAN, broadcast radio systems, point-to-point radio systems and many other known and future applications. The communication radius covered by a respective wireless communication system basically depends on the technique used. Whereas cellular communication systems, such as the GSM and UMTS system are adapted for a communication radius up to about 10 km (ore more), wireless LAN is in the range of about 100 m (ore more), and the Bluetooth system is in the range of several 10 m (ore more). The major influences on the communication range of a wireless communication system are the radio frequency and output power used. Although only little absorption of electromagnetic waves in the atmosphere occurs at the radio frequency used for GSM and UMTS, a significant absorption occurs in the 60 GHz range which makes it quite well-suited for low range and indoor wireless communication. Furthermore, the kind of transmission and/or reception antennas used for a respective wireless communication technique varies depending on a respective field of application.

The use of wide beam antennas in high data rate millimeter wave wireless communication systems is problematic because of the multi path fading effect. By using antennas with a high half power beam width the gain of the antenna is reduced and this is undesirable.

In some communication systems, directional antennas or beam antennas having a high gain at a specific azimuth or elevation angle and reduced gain at other angles are used. They are typically used for radio communication systems to increase the signal to noise ratio (SNR) when the antenna at the receiver and/or transmitter are pointed at a direction to provide maximum SNR.

Alternatively, if interference is present, directional antennas are traditionally pointed at the direction which maximizes the wanted signal power and minimizes the interference power, thereby maximizing the signal interference plus noise ratio (SINR).

Figure 1:
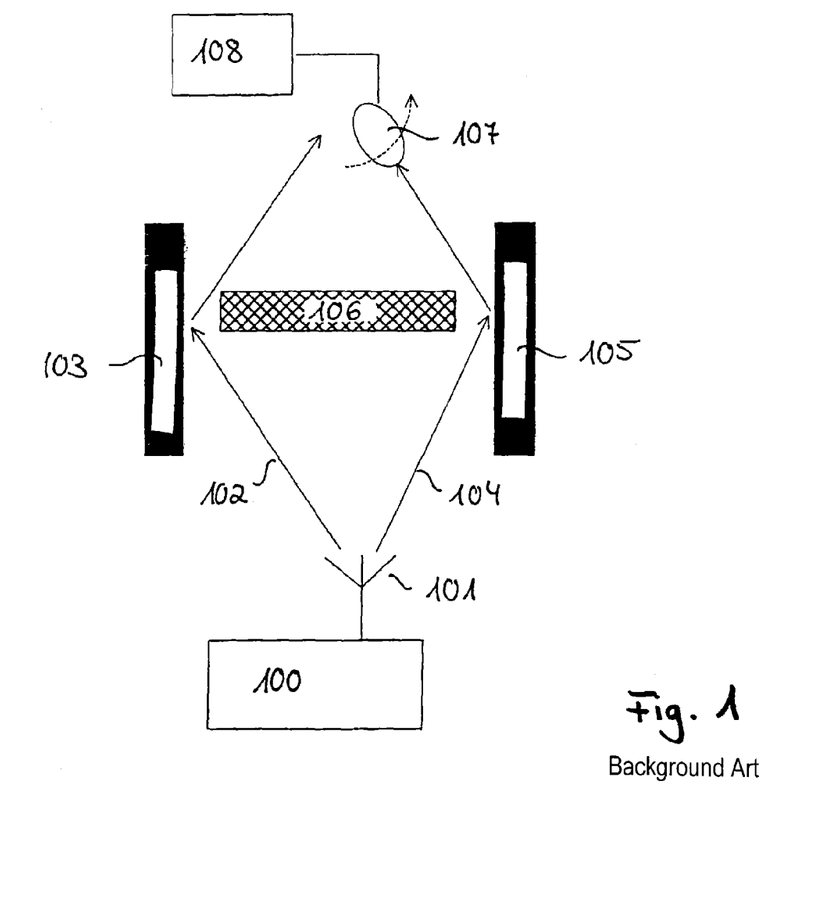

When using beam antennas or directional antennas, there are a number of drawbacks. A first drawback according to a state of the art system using a beam antenna is shown in FIG. 1. A signal is sent from an antenna 101 of a transmitter 100 to a receiver 108. Hereby, as the direct line of sight path is blocked by an obstacle 106, such as a moving human being, a vehicle or the like, there are two reflection paths 102, 104 between the transmitter 100 and the receiver 108, i.e. transmission paths in which the transmitted electromagnetic wave is reflected at least once by objects 103, 105 before it reaches the receiver 108. In case that the receiver 108 comprises a beam antenna 107, it may happen that if the wanted signal can be received at high SNR from multiple different angles (which have angular separations greater than the half power beam width of the directional antenna) the use of a single directional antenna reduces robustness and diversity since the link quality is then totally dependent on the channel conditions from one particular angle.

Figure 2A:
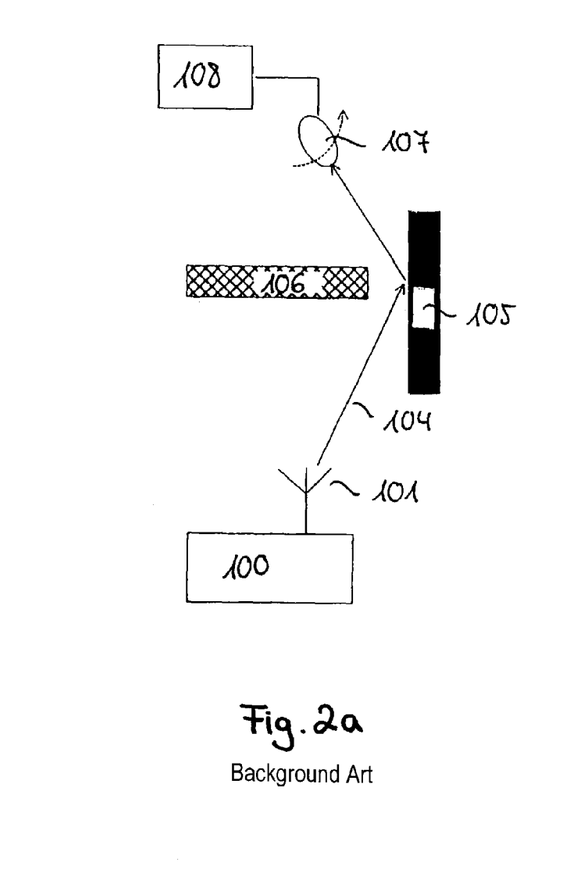
FIGS. 2a and 2b show different states of the communication system according to the state of art.
Figure 2B:
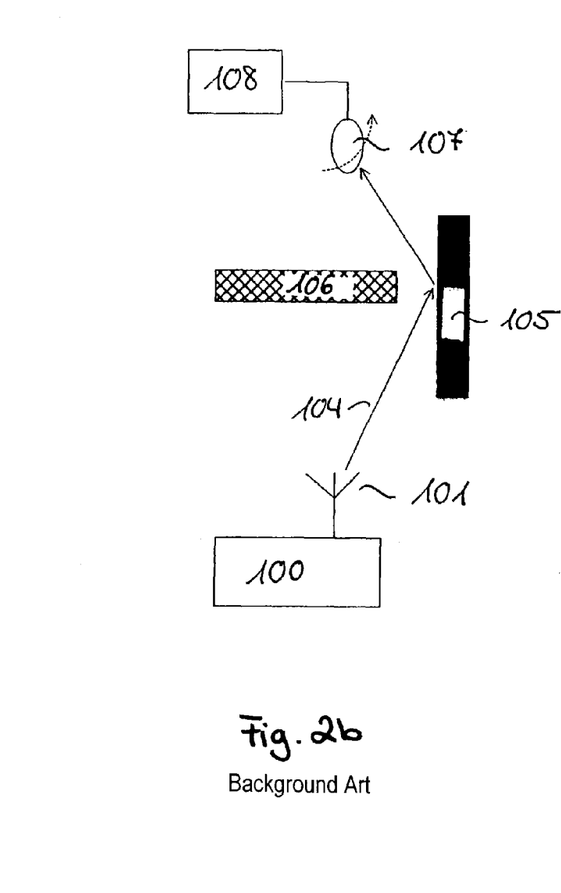

FIGS. 2a and 2b show a further drawback when using a single narrow beam antenna according to the state of art. A signal is again sent from a transmitter 100 to a receiver 108. In situations when the transmitter 100 and the receiver 108 are mobile, the beam antenna 107 at the receiver and (in case a beam antenna is also used at the transmitter) the beam antenna at the transmitter needs to be dynamically aligned choosing a positioning algorithm. If this algorithm makes an alignment error or does not function properly, the antennas are not perfectly aligned and the performance is degraded. As shown in FIG. 2a, the beam antenna 107 is perfectly aligned and the signal 104 can be received properly. In FIG. 2b the case is shown that the beam antenna 107 of the receiver 108 is misaligned which results in a degradation of the performance.

One approach to reduce these drawbacks is to use a beam antenna with a higher half power beam width.

It is therefore the object of the present invention to increase the half power beam width of the antenna while maintaining a high antenna gain. It is also an object to increase robustness or diversity.

The above objects are achieved by a transmitting device for transmitting signals in a wireless communication system according to claims 1 and 7, a method for transmitting signals in a wireless communication system according to claims 21 and 27, a receiving device for receiving signals in a wireless communication system according to claim 12, and a method for receiving signals in a wireless communication system according to claim 32.

The present invention relates to a transmitting device for transmitting signals in a wireless communication system, comprising at least two beam antennas, each beam antenna having a main beaming direction at a different angle, and generating means for generating a number of signal streams to be transmitted within the wireless communication system, whereby the signal to be transmitted is split into these different streams and said number of signals streams corresponds to the number of beam antennas, whereby each signal stream is transmitted via a different beam antenna.

The present invention further relates to a transmitting device for transmitting signals in a wireless communication system, comprising at least two beam antennas, each beam antenna having a main beaming direction at a different angle, and generating means for generating a number of signal streams to be transmitted within the wireless communication system, whereby each of these signal streams comprises a different version of the data, and said number of signal streams corresponds to the number of beam antennas, whereby each signal stream is transmitted via a different beam antenna.

The present invention further relates to a receiving device for receiving signals in a wireless communication system, comprising at least two beam antennas, each beam antenna having a main beaming direction at a different angle, whereby via each beam antenna a signal stream is received in the wireless communication system and combination means for combining the signal streams received via the different beam antennas into a single signal.

The present invention further relates to a method for transmitting signals in a wireless communication system, comprising the steps of providing at least two beam antennas, each beam antenna having a main beaming direction at a different angle, generating a number of signal streams to be transmitted within the wireless communication system, whereby the signal to be transmitted is split into these signal streams and said number of signal streams corresponds to the number of beam antennas, and transmitting each signal stream via a different beam antenna.

The present invention further relates to a method for transmitting signals in a wireless communication system, comprising the steps of providing at least two beam antennas, each beam antenna having a main beaming direction at a different angle, generating a number of signal streams to be transmitted within the wireless communication system, whereby each signal stream comprises a different version of the data to be transmitted and said number of signal streams corresponds to the number of beam antennas, and transmitting each signal stream via a different beam antenna.

The present invention further relates to a method for receiving signals in a wireless communication system, comprising the steps of providing at least two beam antennas, each beam antenna having a main beaming direction at a different angle, receiving via each beam antenna a signal stream in the wireless communication system and combining the received signal streams via the different beam antennas into a single signal.

By transmitting or receiving the signal over different antennas the effective half power beam width of the antenna system is increased while at the same time a high antenna game is maintained. Further, the robustness or diversity can be increased.

The beam antennas can be overlapping.

The beam antennas can be not overlapping.

The split signal streams can be mapped onto different sub-carriers and preferably, regular interlaced splitting is used.

The split signal streams can be upconverted using different centre frequencies and preferably, block processing is used.

For each of the split signal streams a different modulation scheme is used and preferably, adaptive sub-carrier loading is used.

The different versions of data can be encoded using different encoding schemes and preferably, space time block coding or space time trellis coding is used.

The different versions of data can be cyclically shifted and preferably, cyclic delay diversity is used.

The signal can be received in different signal streams.

The combining of the received signal streams can be achieved by using regular interlaced splitting.

The combining of the received signal streams can be achieved by downconverting the signal streams from different centre frequencies and preferably, by using block processing.

The combining of the received signal streams can be achieved by using a different demodulation scheme for each signal steam and preferably, by using adaptive sub-carrier loading.

Each received signal stream can comprise a different version of the received data.

The different versions of the received data can be combined by using different decoding schemes and preferably, by using space time block coding or space time trellis coding.

It is to be noted that the present invention can be applied to any kind of wireless communication system which enables the transmission and reception of signals over any kind of range. Further, the present invention is not restricted to any kind of modulation schemes of technical implementation of the wireless communication. Some embodiments and implementations of the present invention, however, might be advantageous in short and/or mid range wireless communication systems in which signals are transmitted in the millimeter wave range, as e.g. the 60 GHz transmission range. Further, the transmitting device and the receiving device of the present invention can be any kind of device adapted to transmit and receive respectively signals in a wireless communication system. The terms "transmitting device" and "receiving device" are hereby intended to comprise any kind of portable and/or stationary communication equipment, unit, means, system and so forth. The signals to be transmitted from the transmitting device to the receiving device according to the present invention may comprise any kind of information, data, symbols and so forth which can be transmitted from a transmitter to a receiver for any kind of reason and utility. According to the present invention, at least one of the transmitting device and the receiving device comprise a narrow beam antenna which is adapted to be steered to different positions. In some implementations it might be preferable that the transmitting device and the receiving device each comprises a narrow beam antenna which is adapted to be steered to different positions. The term "narrow beam antenna" or "beam antenna" is hereby intended to comprise and cover all kinds of antennas which, in contrary to omnidirectional antennas which do not have a specific transmission and/or reception direction, have a specific transmission and/or reception direction without any limitation to the specific shape of the antenna beam. Further, the beam antenna of the present invention is not restricted to any specific steering type, i.e. the specific technical implementation which enables the steering or switching of the narrow beam antenna to different transmitting and/or reception positions as long as the transmitting and/or receiving direction of the narrow beam antenna can be changed, switched, varied and the like. For example, but not exclusively, a beam antenna according to the present invention may be an antenna with a fixed narrow beam radiation pattern which can be varied by mechanically or electrically shifting the antenna so that the beam direction is varied. Further, the narrow beam antenna could be any antenna which can be steered by changing the phase and/or the gain of the antenna so that the beam direction changes. As a further alternative, the narrow beam antenna could consist of an antenna pattern, whereby each of the antenna elements of the antenna pattern has a specific narrow beam antenna direction and the elements can be controlled in a way that the beam direction of the antenna is changed. Many other examples of steerable beam antennas can be made, which are currently known or which may be developed in the future, but which would fall under the scope of the present invention.

So in this context a beam antenna refers to an antenna with directional properties which is formed by any of the following methods:

an antenna which is connected from a bank of antennas with directional properties, or an antenna formed by a network containing antennas or antenna elements which have omni-directional or directional properties and phase shifters, or an antenna formed by forming a selection of antennas or antenna elements, which have omni-directional or directional properties.

The present invention will be explained in more detail in the following description of preferred embodiments in relation to the enclosed drawings, in which FIG. 1 schematically shows a communication system according to the state of art.

Figure 3:
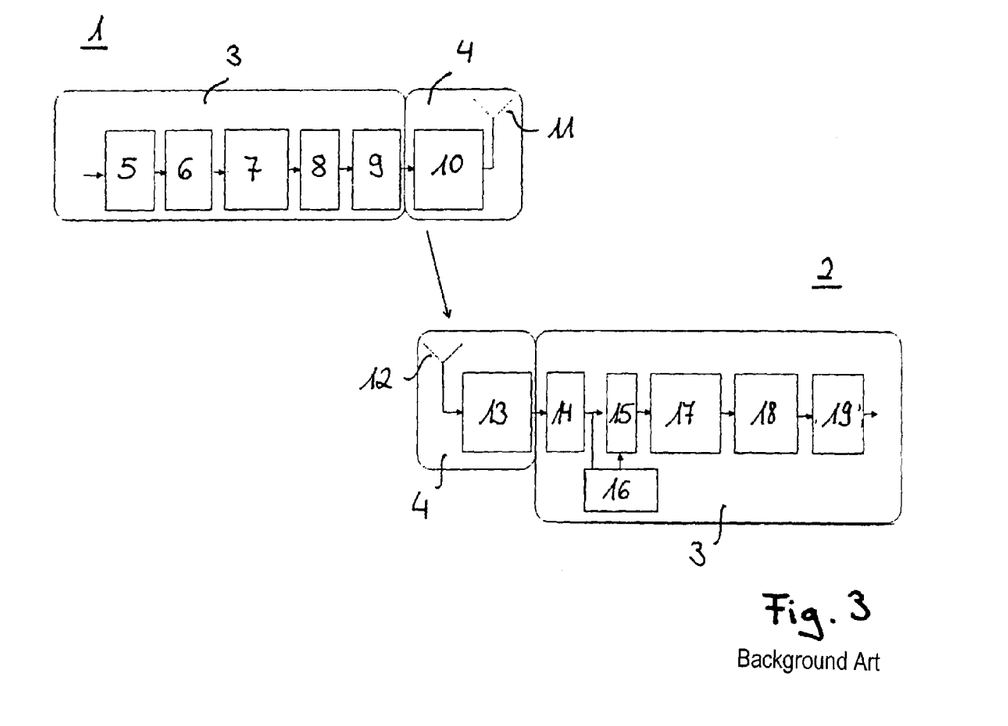
FIG. 3 shows a transmitting device and a receiving device according to the state of art.

FIG. 3 shows a schematic block diagram of an example the transmitting device 1 using orthogonal division multiplexing (OFDM) and the receiving device 2 according to the state of art. The transmitting device 1 and the receiving device 2 hereby comprise a base band section 3 for processing base band signals and an RF section 4 for processing the upconverted signals.

The transmitting device 1 comprises a channel coding means 5 for adding error correction codes to the signals to be transmitted. The signal is then processed by an interleaver 6 where the data of the signal are arranged in a non-contiguous way in order to increase error correction performance. The signal is then modulated by a modulator 7 and then by an inverse Fast Fourier Transformation (IFFT) 8 is applied to the signal.

In a digital to analogue converter 9, the signal is converted and filtered and then sent to an upconverter 10 where the signal is upconverted to a different frequency band and power amplified. From there it is sent to the antenna 11 and transmitted via a wireless communication system.

The receiving device 2 comprises an antenna 12 for receiving the signal over the wireless communication system, a downconverter 13 for downconverting the signal to the base band and for accomplishing low noise amplification. An FFT 14 applies Fast Fourier Transformation onto the signal. This signal by an equalizer 15 and a channel estimator 16 is then processed and further demodulated by a demodulator 17. In a interleaver 18 and a channel decoding means 19, the respective steps for the interleaving and channel coding in order to perform error correction are accomplished.

The transmitting devices and receiving devices according to the present invention comprise all the components of a state of the art transmitting and receiving device in order to enable proper processing of transmitted and received signals. In the figures there are only displayed elements which are necessary for the implementation and the understanding of the present invention. All other necessary elements are not shown for the sake of clarity. However, in the practical implementation all such elements would be implemented. In addition, the transmitting devices and receiving devices according to the present invention comprise elements such as memories for storing data, information, applications, software codes, and so forth, controller means for controlling the operation, a power supply and so on.

The idea underlying the present invention will be described in the following. The idea can be applied to the transmitting device, to the receiving device or both.

As already explained, the object of the present invention is to increase the effective half power beam width of the beam antenna without decreasing the gain or to increase the diversity in communication link. This is achieved by transmitting and/or receiving the signal in several signal streams. Each signal stream is transmitted and/or received by a separate beam antenna, whereby the separate beam antennas have their main beaming direction at different angles. It is to be noted that in the following the embodiments are described using an OFDM system, however, the idea can be used with any system which has two or more carriers and is not limited to an OFDM system.

Figure 4A:
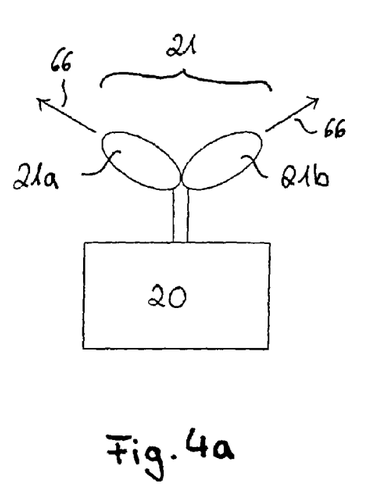
FIGS. 4a and 4b show the main principle underlying the present invention.
Figure 4B:
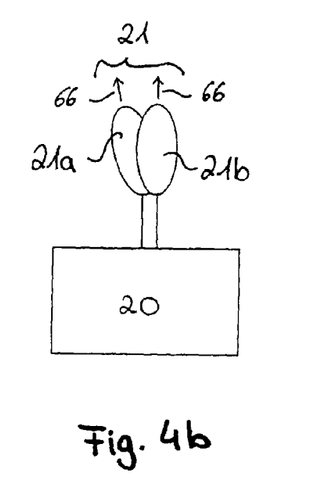

In FIGS. 4a and 4b, the main idea underlying the present invention is shown. In FIG. 4a, a transmitter and/or receiver 20 is shown having two separate beam antennas 21a, 21b.

Each of these beam antennas has a main beaming direction 66, a maximum response or a peak response at a different azimuth and/or elevation angle. According to the embodiment shown in FIG. 4a the beam antennas have main beaming directions 66 at different angles. The same applies to the beam antennas 21a, 21b in FIG. 4b, also each having different main beaming directions 66, but in contrast to FIG. 4a the beam antennas 21a, 21b of FIG. 4b are overlapping whereas the beam antennas 21a, 21b of FIG. 4a are not overlapping.

In cases in which the signal can be received or transmitted at high signal to noise ratio (SNR) using different angles, the arrangement of non-overlapping beams according to FIG. 4a would be more suitable. Alternatively, the overlapping case according to FIG. 4b may be an advantage in situations in which the transmitter or receiver wants to increase the effective half power beam width of the antenna. This can be useful in situations where it is desirable to reduce the sensitivity of the communication link to misalignment errors.

According to the main idea underlying the present invention, when transmitting a signal the signal is not transmitted in a single signal stream but several signal streams are generated and each signal stream is transmitted over a different beam antenna. Same applies when a signal is received in different signal streams then each of the different signal streams is received by a different beam antenna and the signal streams by the receiver are combined to a single signal. It is to be noted that the present invention is not limited to the use of two beam antennas but also covers embodiments having three or more beam antennas and respectively transmitting and receiving three or more signal streams.

Hereby, according to the present invention the signal streams are either generated by splitting up the signal into several signal streams, or the signal streams each correspond to the complete data to be transmitted but provides a different version of the data to be transmitted. Preferably, the methods used for transmitting and receiving signal streams via different beam antennas are regular interlaced splitting, block splitting, sub-stream adaptive loading, space time block coding or cyclic delay diversity (CDD).

Hereby, according to the present invention, in case that the signal is transmitted or received over different signal streams, multi-carriers are used. On the other hand, preferably if according to the present invention different versions of the data are transmitted, one carrier is used.

According to a first embodiment of the present invention, the transmitted signal is split into N streams and mapped onto different sub-carriers. Preferably, regular interlaced splitting is used. This method is described in document U.S. Pat. No. 7,046,617 B2 which is incorporated herein by reference.

Document U.S. Pat. No. 7,046,617 B2 proposes an OFDM system in which the transmitter has at least two antennas and the sent data stream is multiplexed onto these antennas. For a two antenna system the transmitter data stream is therefore multiplexed onto the antennas, such that the even sub-carriers are multiplexed onto the first antenna and the odd sub-carriers are multiplexed onto the second antenna.

Figure 5:
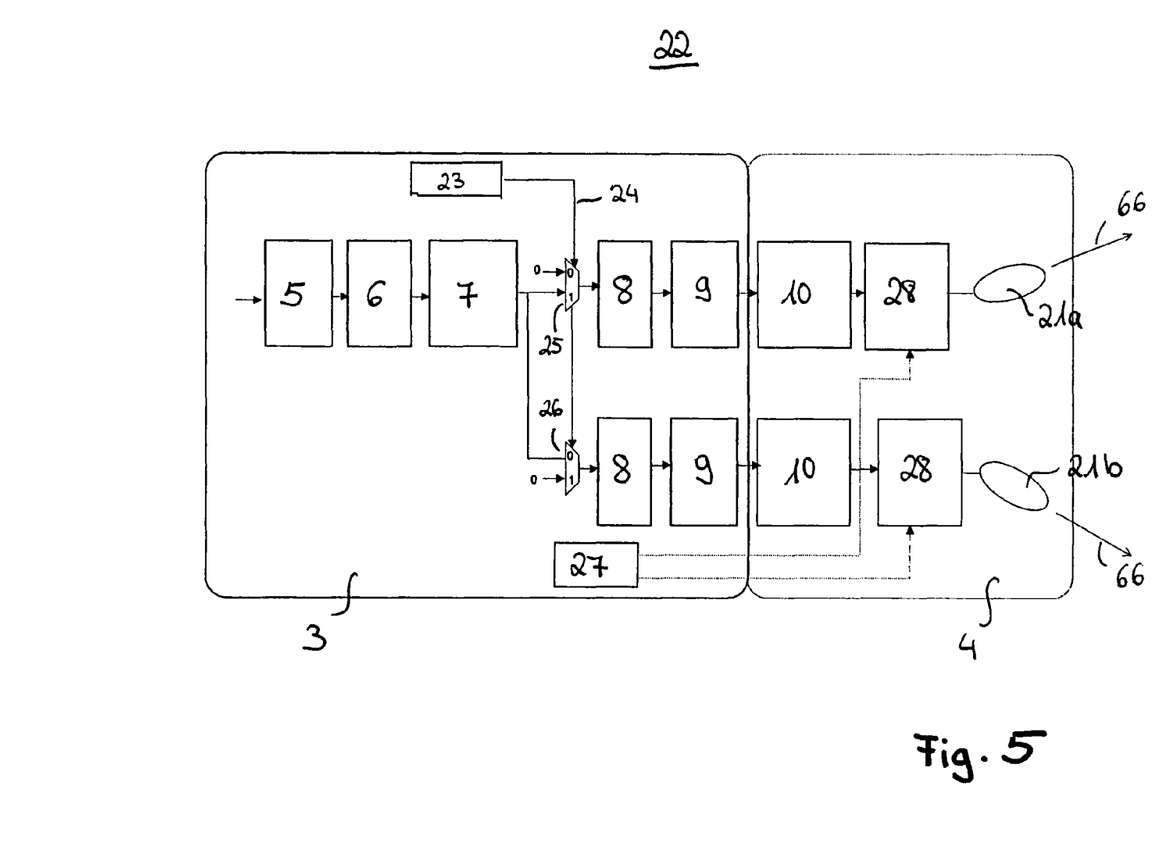
FIG. 5 shows a transmitting device according to a first embodiment of the present invention.

FIG. 5 shows a transmitting device 22 using regular interlaced splitting. Hereby, the embodiment according to FIG. 5 comprises two beam antennas 21a and 21b and is adapted to split the signal into two streams. As already explained, the present invention is not limited to two signal streams and two beam antennas. When using regular interlaced splitting, the data is mapped in an even/odd fashion onto the sub-carriers. Here fore, the modulation symbols output from the modulator 7 are upsampled by a factor of 2 via zero insertion between the modulation symbols. Specifically, the signal 24 at multiplexers 25, 26 toggles at a symbol rate, where the symbol rate is the rate at which the symbols are output from the modulator 7, so that the modulation symbols output from the modulator 7 are input to either of the two IFFT 8. When the modulation symbols are input to the first IFFT 8 a zero is input to the other IFFT means 8 and vice versa. Zeros are inserted for sub-carriers not assigned to either beam antenna 21a, 21b so as to keep the symbol rate unchanged. The two signal streams are then further processed as according to the state of art. When using a beam antenna, then a steering means 28 has to be implemented which is fed by a beam forming algorithm means 27 in order to decide on the shape and/or selection and/or direction of the beam antennas 21a, 21b as previously described.

When using regular interlaced splitting the signal streams can be received by two types of receiving devices. A first type is shown in FIG. 6a and a second type is shown in FIG. 6b.

Figure 6A:
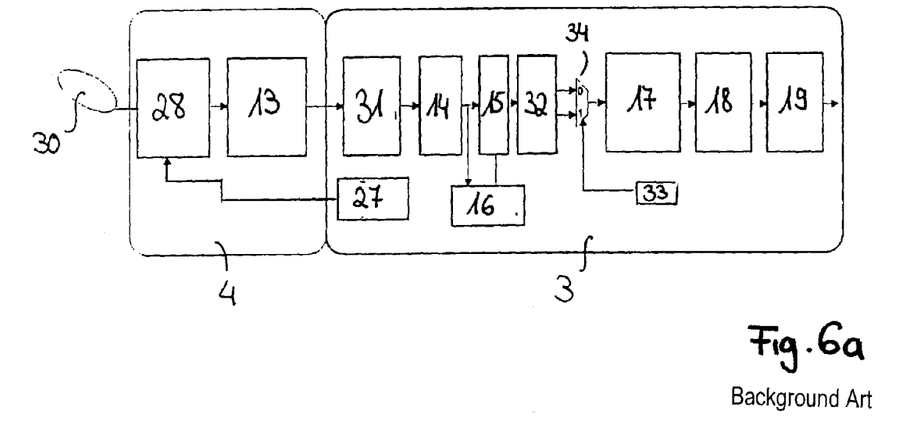
FIG. 6a shows a receiving device according to the state of art.

The receiving device 29 according to FIG. 6a consists of one receiver chain using one receiver antenna 30. This antenna can be an omni-directional antenna or a beam antenna. The received signal is downconverted by downconverter 13 and then analogue to digital converted and filtered by ADC 31. The signal is further processed by a demultiplexer 32 M:N whereas N represents the number of signal streams and M represents the size of the FFT. The signal 33 toggles between selecting a receive path and removing the zeros. The further processing corresponds to the processing according to the state of art as previously described.

Figure 6B:
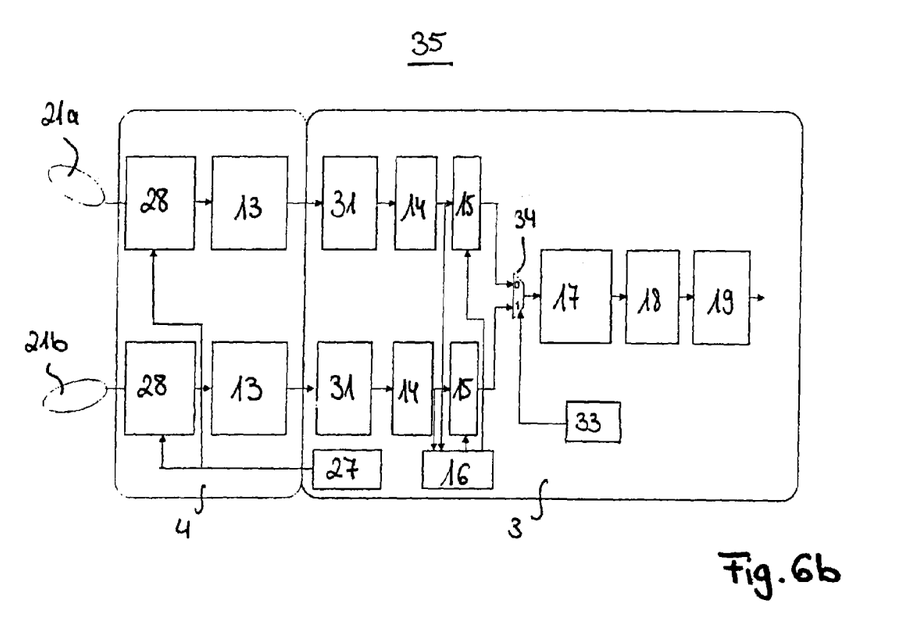
FIG. 6b shows a receiving device according to a first embodiment of the present invention.

In contrast hereto as shown in FIG. 6b, the receiving device 35 may also comprise two beam antennas 21a, 21b and multiple receiver chains. Here, the signal 33 toggles the multiplexer 34 between selecting the first and the second receive paths, wherein during the process of demultiplexing the two signal streams the zeros inserted by the transmitting device are removed.

By using such an approach it is assured that adjacent symbols from the modulator are transmitted from different antennas. This enhances diversity in conjunction with channel decoding at the receiver since the channel responses from the different beam antennas to the receiver will be different.

A further possibility for this approach is that the regular interlaced splitting is only performed at a receiver with a beam antenna. Such a possibility could use the receiver as shown in FIG. 6b and the standard transmitter as shown in FIG. 3.

Figure 7:
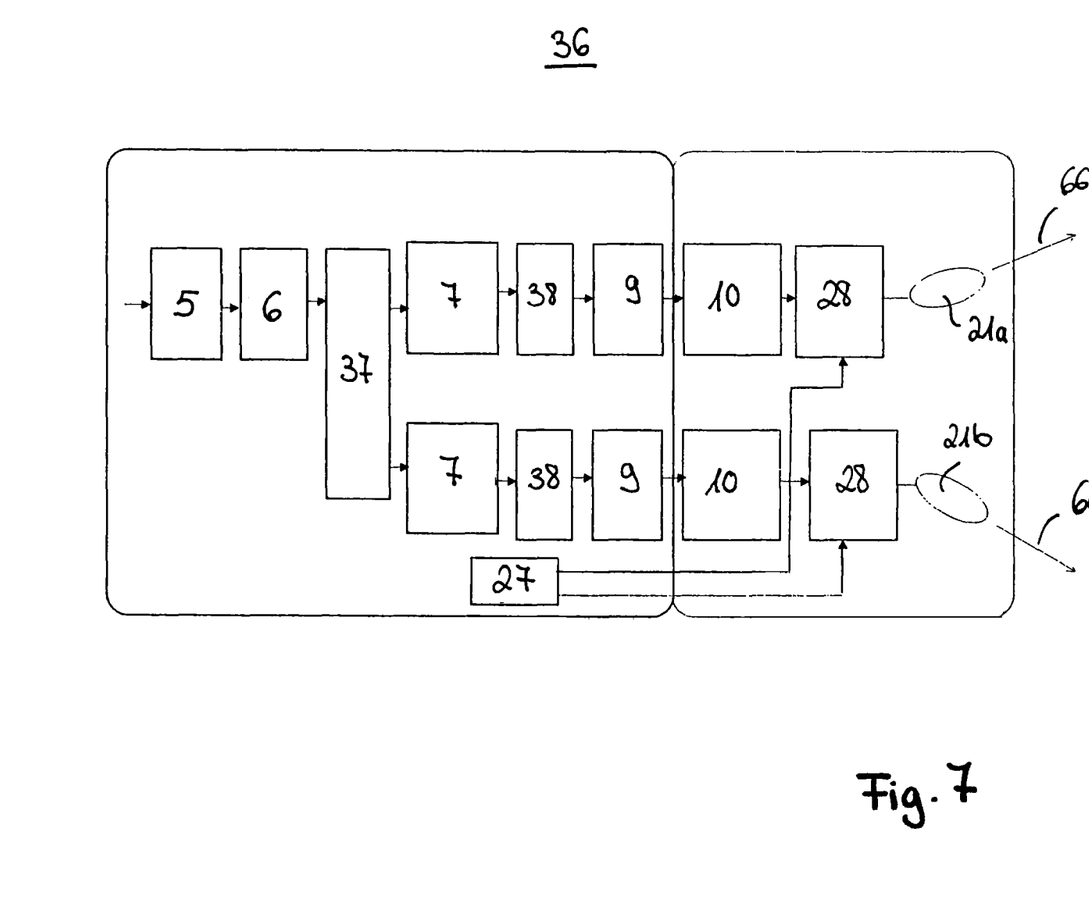
FIG. 7 shows a transmitting device according to a second embodiment of the present invention.

According to a second embodiment of the present invention the signal streams are upconverted using different centre frequencies. Preferably, block splitting is used. A transmitting device 36 using block splitting is shown in FIG. 7. Again, the present invention is exemplary shown in an embodiment with two beam antennas, but the present invention is not limited to the number of two beam antennas 21a, 21b. In this approach, a frequency interleaver 37 is used which has N outputs, N corresponding to the number of beam antennas 21a, 21b. Each output is then passed to a modulator 7 which in turn passes the signal to an IFFT 38. For this approach each IFFT 38 only transmits 1 of the total transmission bandwidth and its size is advantageously 1/N and therefore smaller than the system proposed in the previous embodiment. After digital to analogue conversion in the DAC 9, the N streams are passed to upconvertion in the upconverter 10, whereby each signal stream is upconverted using a different centre frequency so that the N transmitted streams occupy adjacent frequency bands.

In this approach, the frequency interleaver 37 ensures that adjacent input bits are mapped to sub-carriers which have a frequency spacing of two or more sub-carriers.

For this approach again, two receiving devices can be used. A first receiving device 39 is shown in FIG. 8a and a second receiving device 43 is shown in FIG. 8b.

Figure 8A:
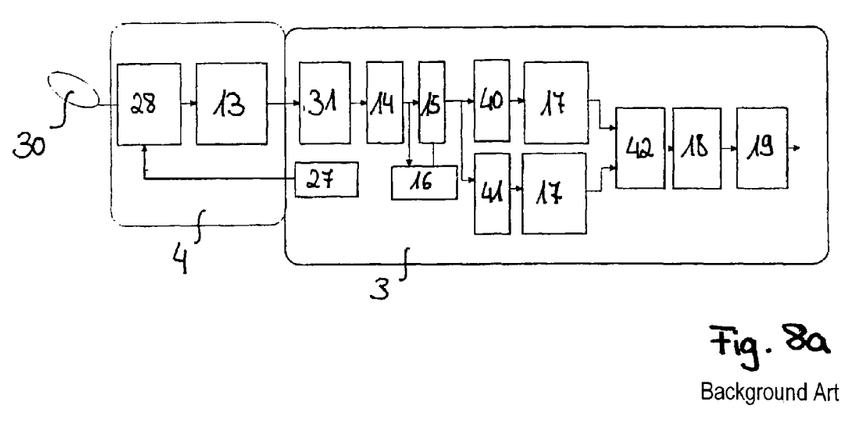
FIG. 8a shows a receiving device according to the state of art.

According to FIG. 8a, the receiving device 39 can consist of one receiver chain using one receiver antenna 30. This antenna can be an omni-directional antenna or beam antenna. Hereby, two carrier processing means 40, 41 are implemented, whereby the first carrier processing means processes the first M/2 carriers and the second carrier processing means 41 processes the second M/2 carriers, whereby M is the size of the FFT 14. Two demodulators 14 are provided and then the two signals are deinterleaved in a frequency deinterleaver 42 and then further processed as a single signal stream.

Figure 8B:
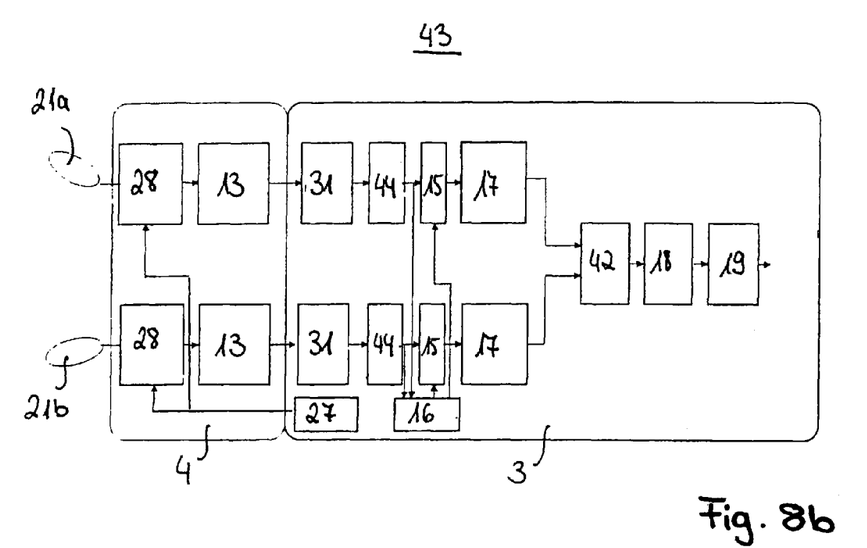
FIG. 8b shows a receiving device according to a second embodiment of the present invention.

FIG. 8b shows a second possibility for a receiving device 43 according to this second embodiment of the present invention. Hereby, the receiving device 43 comprises multiple receiver chains, whereby each receiver chain is connected to a separate beam antenna 21a, 21b. Hereby, only half size FFT 44 have to be used. Accordingly, in an embodiment with N antennas and N signal streams, only FFTs having a size of 1/N have to be used. In the embodiment described in FIG. 8b, the two signal streams are combined together in the frequency deinterleaving means 42.

A further possibility for this approach is that the block processing with a beam antenna is only performed at the receiver side. Such a possibility could use the example receiver as shown in FIG. 8b and the standard transmitter shown in FIG. 3.

According to a third embodiment, the signal is split into N streams and for each signal stream a different modulation scheme is used. Preferably, sub-stream adaptive loading is used. Herefore, the signal is split into N signal streams so that the different signal streams have different modulation schemes.

This is particular useful if the signal to noise ratios of the N links (from the N signal streams transmitted by the N beam antennas to the receiver) are different. For optimum performance information is needed from the receiver to the transmitter with regards to the signal to noise ratios of the different links, or information regarding the selective modulation schemes which should be used at the transmitter. The simplest way to achieved sub-stream adaptive loading is to choose modulation schemes across the signal streams which results in the same total data rate being sent, as if all the signal streams have the same nominal modulation scheme. By doing this it is ensured that the correct numbers of bits are available at different modulation inputs.

To explain this more clearly, by using a system with N=2 and a nominal modulation scheme of 16 QAM (four bits/symbol), one stream using half the available sub-carriers could transmit 4 QPSK (two bits/symbol), and the other stream using the other half of available sub-carriers could transmit 64 QAM (6 bits/symbol) which results in the same overall data rate but with the advantage that the stream with the lower signal to noise ratio uses the lower level modulation scheme (QPSK) and the stream with higher signal to noise ratio uses the higher level modulation scheme.

Figure 9A:
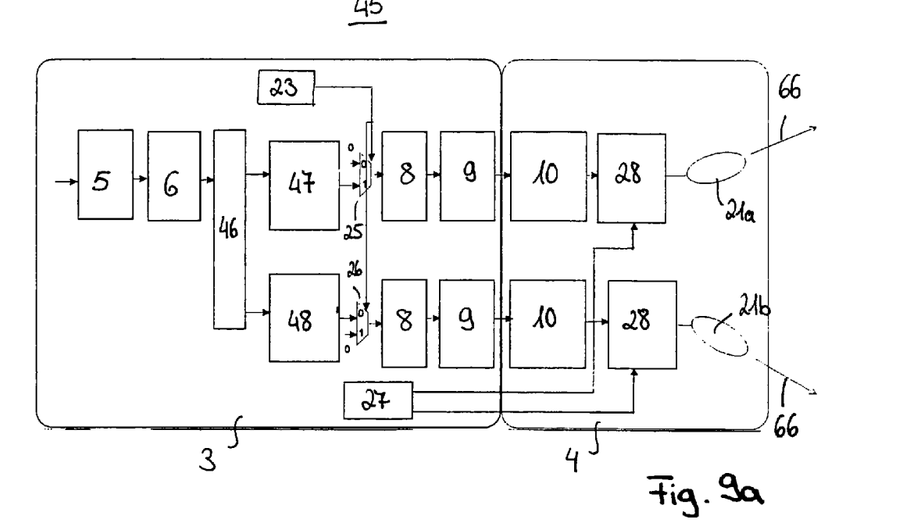
FIGS. 9a and 9b show transmitting devices according to a third embodiment of the present invention.
Figure 9B:
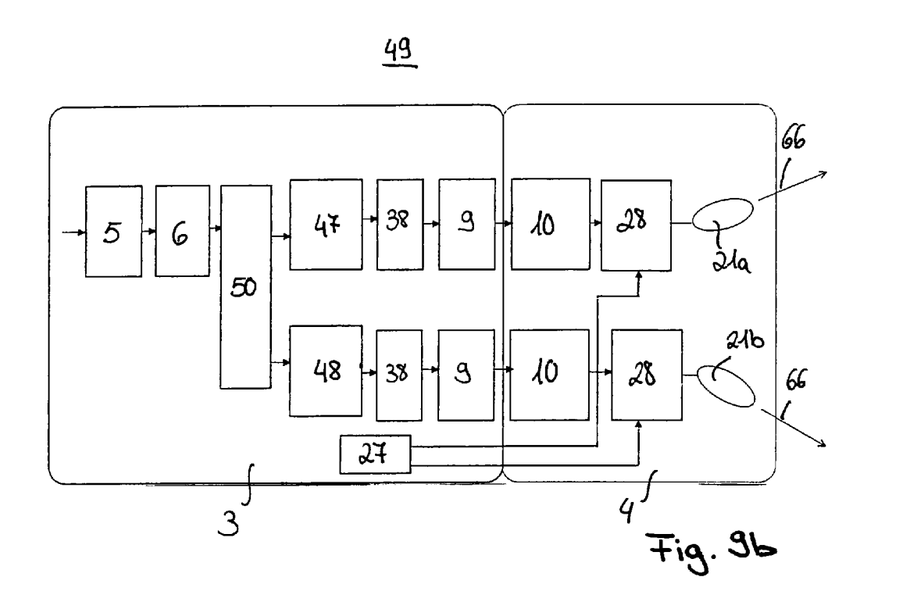

Examples of transmitting devices according to this approach with N=2, i.e. two beam antennas 21a, 21b and two signal streams transmitted over the antennas are shown in FIGS. 9a and 9b.

In FIG. 9a, it can be seen that the two different signal streams are separated after the interleaver 6 and then passed to a multiplexer 46 which sends the correct numbers of bits to each of the modulators 47, 48 for the required modulator modes. Hereby, n bits are passed the first modulator 47 modulating on a first level and m bits are passed to the second modulator 48 modulating on a second level. The outputs of these modulators are then passed to the IFFTs 8 in such a way that the carriers from the different streams are interlaced.

FIG. 9b shows an alternative implementation using block splitting. Hereby, the frequency interleaver 50 separates adjacent bits and ensures that adjacent input bits are mapped to sub-carriers which have a frequency spacing of two or more sub-carriers. Furthermore, the frequency interleaver 50 outputs the correct number of bits to each modulator so that the selected modulation schemes can be used. Hereby, again n bits are passed to the first modulator 47 and m bits are passed to the second modulator 48. The IFFTs 38 hereby only have to be half size. Accordingly, when providing N signal streams and N beam antennas, the IFFTs have a size of 1/N. In case that sub-stream adaptive loading is used at the transmitter, it is important that the receiver is aware that the transmitted signal is sent using these modes so that the required processing is implemented in the receiving device to correctly demodulate the signal.

According to a fourth embodiment N different versions of the data are transmitted in N different signal streams. Preferably, space time block coding is used. Another suitable alternative for obtaining diversity for the beam antennas 21a, 21b is to use a space time block code (STBC) or a space time trellis code (STTC) at the transmitter. Many such codes for different numbers of transmitting antennas are known. The most well-known of these is the space time block code from Alamouti which is disclosed in document "A Simple Transmit Diversity Technique for Wireless Communications" by Siavash M. Alamouti, published in the "IEEE Journal on Select Areas in Communications" Vol. 16 of Oct. 8, 1998; which is enclosed herein by reference.

Figure 10:
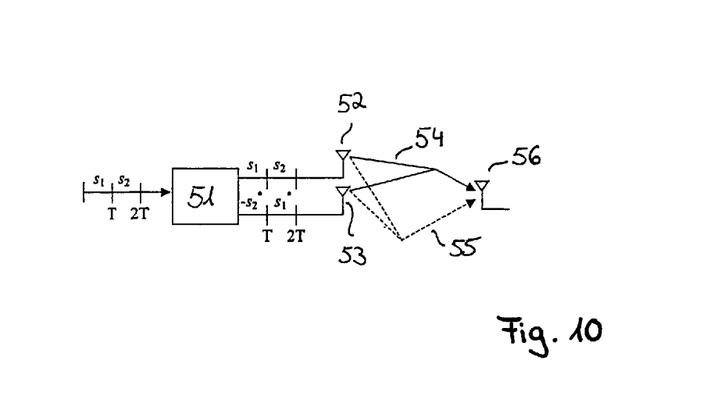
FIG. 10 shows schematically a block diagram of a space time encoder.

An encoder 51 for space time block coding for a system with two transmitters is shown in FIG. 10. Hereby, the STBC encoder receives two blocks of complex symbols $s_1$ and $s_2$, and for each input block produces two orthogonal output blocks, each containing two complex symbols. In this way, the signal is not split into several signal streams but there are transmitted as differently encoded streams. These are then sent to respective upconverters and then subsequently transmitted by the different transmitting antennas 52, 53. Due to the orthogonal nature of the transmitted symbols from the STBC encoder, if the channel does not significantly change over the two transmitted complex symbols, the encoded data can be decoded with simple operations and with the benefit of maximum diversity.

Figure 11:
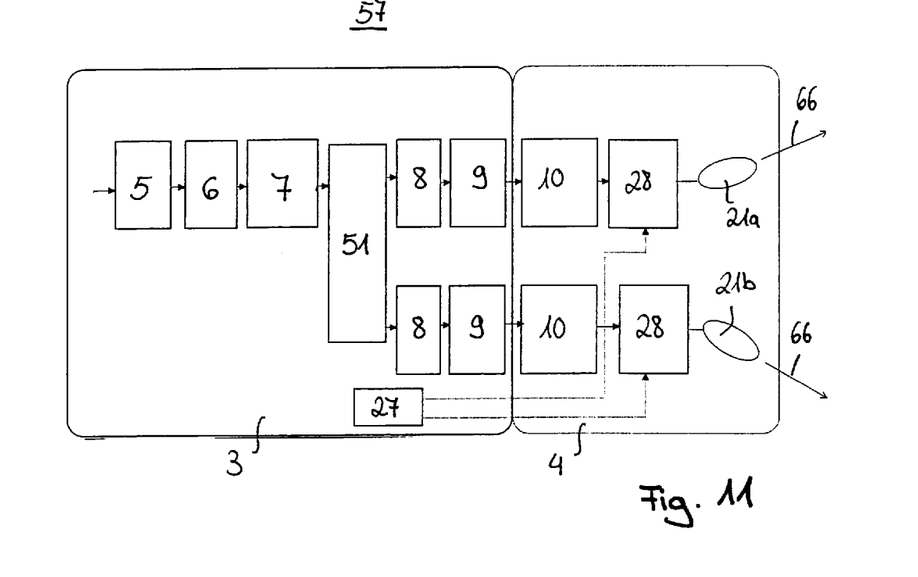
FIG. 11 shows a transmitting device according to a fourth embodiment of the present invention.

An example transmitter is shown in FIG. 11. Hereby, the transmitting device 57 comprises a space time block code (STBC) encoder 51 which works as previously described.

Figure 12A:
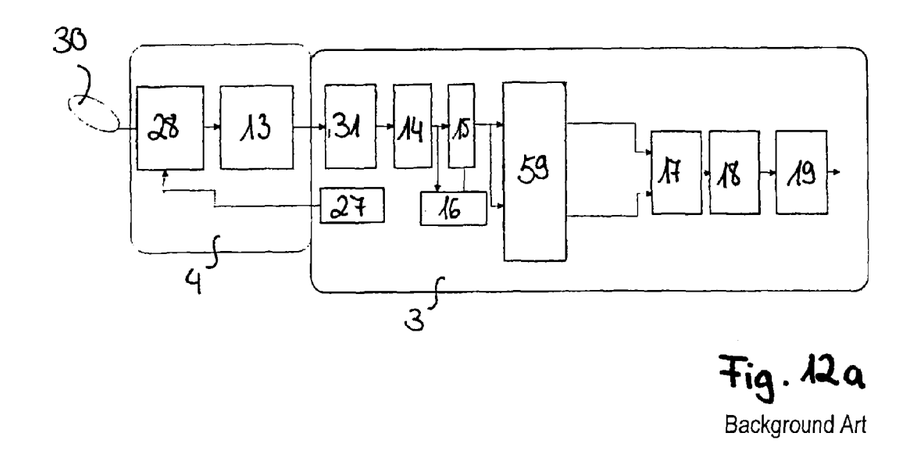
FIG. 12a shows a receiving device according to the state of art.
Figure 12B:
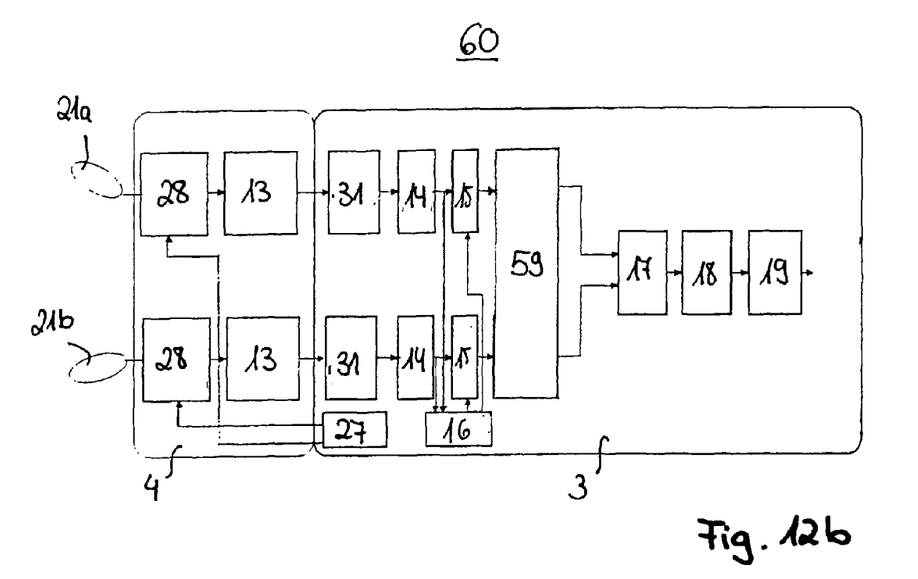
FIG. 12b shows a receiving device according to a fourth embodiment of the present invention.

This approach can be implemented in the receiving device in two ways. According to FIG. 12a, a receiving device 58 may be used having a single antenna which may be an omni-directional or a beam antenna and having a single receiver chain comprising a space time block coding decoder 59. As an alternative as shown in FIG. 12b, the receiving device 60 may comprise two beam antennas 21a, 21b and two receiver chains.

In case that space time block coding is used at the transmitter, it is again important that the receiver is aware that the transmitted signal is sent using these modes, so that the required processing is implemented in the receiver to correctly demodulate the signal.

According to a fifth embodiment of the present invention, N different versions of the data are transmitted, whereby each of the N signal streams is cyclically shifted. Preferably, cyclic delay diversity (CDD) is used. Cyclic delay diversity provides diversity for multi carrier system with N beam antennas as revealed in documents "Transmit/Receive-Antenna Diversity Techniques for OFDM system" by Armin Damman and Stefan Kaiser, published by the Institute of Communications and Navigation, German Aerospace Center (DLR), Vol. 13, No. 5 of September/October 2002 and "Standard Conformable Antenna Diversity Techniques for OFDM and its Application to the DVB-T System" by Armin Damman and Stefan Kaiser, published by the Institute of Communications and Navigation, German Aerospace Center (DLR); which are incorporated herein by reference.

Cyclic delay diversity provides a performance gain since the extra transmitted (N−1) streams are cyclically shifted which introduces extra delay transmitted signals. These extra delay components add to the multi-path delays in the channel, yielding an effective channel with more multipath dispersion and therefore more frequency selectivity. This enables the channel coding at the receiver to be more effective, yielding a noticeable performance improvement.

Figure 13:
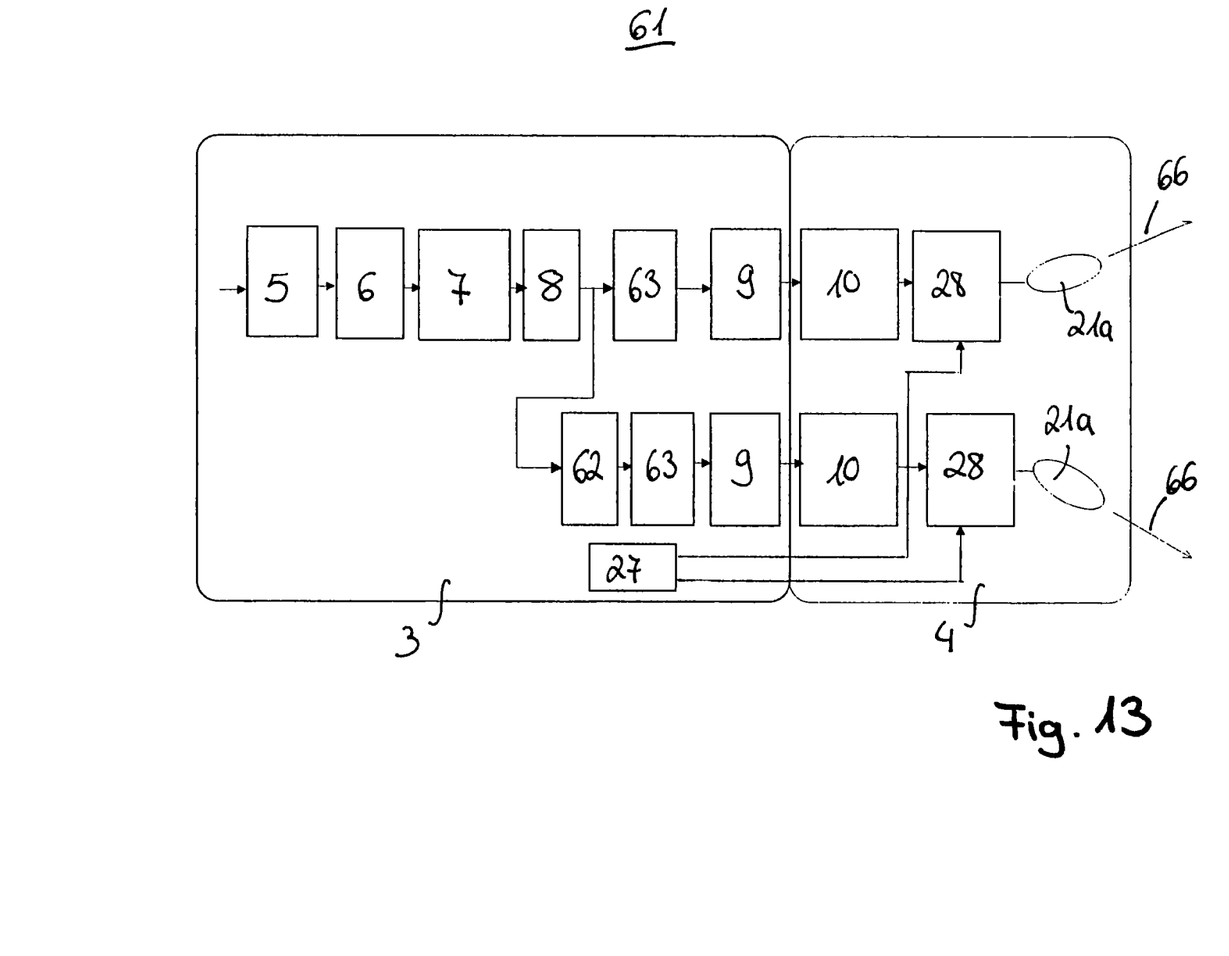
FIG. 13 shows the transmitting device according to a fifth embodiment of the present invention.

FIG. 13 shows a transmitting device 61 with cyclic delay diversity. In the transmitting chain before the guard interval is added in the guard interval block 63 in one stream, a cyclic delay diversity by the cyclic delay diversity means 62 is added.

It is to be noted that in the other figures the guard interval block 63 and 65 is omitted for the sake of clarity.

The method of cyclic delay diversity can also be used just at the receiving device with multiple beam antennas with the advantage that only one FFT and one receiver chain is needed.

With the transmitting and receiving devices and the method for transmitting and receiving signal streams over different beam antennas according to the present invention dependent on the shape and direction of the used beam antennas, the effective half power bandwidth of the antenna can be increased while maintaining a high antenna gain. Alternatively, the idea can be used to increase robustness or diversity when the signal can be transmitted or received using different angles.

The invention claimed is:

1. A transmitting device for transmitting signals carrying data in a wireless communication system, comprising:
   at least two beam antennas, each beam antenna having a main beaming direction at a different angle;

a generator configured to generate a number of signal streams to be transmitted over a single-carrier wireless communication channel within the wireless communication system, wherein each of the signal streams includes a different version of the complete data to be transmitted and said number of signal streams corresponds to the number of said at least two beam antennas, wherein each signal stream is transmitted over the wireless communication channel via a different beam antenna of the at least two beam antennas; and a cyclic delay diversity unit configured to cyclically shift each different version of the data and to use cyclic delay diversity.

2. The transmitting device according to claim 1, wherein the at least two beam antennas are overlapping.

3. The transmitting device according to claim 1, wherein the at least two beam antennas are not overlapping.

4. The transmitting device according to claim 1, further comprising an upconverter configured to upconvert the different signal streams using different center frequencies.

5. A transmitting device for transmitting signals carrying data in a wireless communication system, comprising:
  at least two beam antennas, each beam antenna having a main beaming direction at a different angle;
  a generator configured to generate a number of signal streams to be transmitted over a single-carrier wireless communication channel within the wireless communication system, wherein each of the signal streams includes a different version of the complete data to be transmitted, and said number of signal streams corresponds to the number of said at least two beam antennas, wherein each signal stream is transmitted over the wireless communication channel via a different beam antenna of the at least two beam antennas; and
  an encoder configured to encode each different version of the data using different encoding schemes, wherein one of space time block coding and space time trellis coding is used.

6. A method for transmitting signals carrying data in a wireless communication system, comprising:
  providing at least two beam antennas, respective of said at least two beam antennas having a main beaming direction at a different angle; and
  generating a number of signal streams to be transmitted over a single-carrier wireless communication channel within the wireless communication system, wherein each signal stream includes a different version of the complete data to be transmitted and said number of signal streams corresponds in number to the at least two beam antennas; and
  transmitting each signal stream over the wireless communication channel via a different beam antenna of the at least two beam antennas,
  wherein the different versions of the data are cyclically shifted and cyclic delay diversity is used.

7. The method according to claim 6, wherein the at least two beam antennas are overlapping.

8. The method according to claim 6, wherein the at least two beam antennas are not overlapping.

9. The method according to claim 6, wherein the different signal streams are upconverted using different center frequencies.

10. A method for transmitting signals carrying data in a wireless communication system, comprising:
  providing at least two beam antennas, respective of said at least two beam antennas having a main beaming direction at a different angle;
  generating a number of signal streams to be transmitted over a single-carrier wireless communication channel within the wireless communication system, wherein each signal stream includes a different version of the complete data to be transmitted and said number of signal streams corresponds in number to the at least two beam antennas; and
  transmitting each signal stream over the wireless communication channel via a different beam antenna of the at least two beam antennas,
  wherein the different versions of the data are encoded using different encoding schemes and one of space time block coding and space time trellis coding is used.

11. A receiving device for receiving signals carrying data in a wireless communication system, comprising:
  at least two beam antennas, each beam antenna having a main beaming direction at a different angle so that via each beam antenna a different signal stream is received over a single-carrier wireless communication channel in the wireless communication system, wherein each respective different signal stream comprises a different version of the complete data transmitted; and
  a combiner configured to combine the different, cyclically shifted signal streams received over the wireless communication channel via the different beam antennas into a single signal and to combine each different version of the data by using cyclic delay diversity.

12. The receiving device according to claim 11, wherein the at least two beam antennas are overlapping.

13. The receiving device according to claim 11, wherein the at least two beam antennas are not overlapping.

14. The receiving device according to claim 11, further comprising a downconverter configured to downconvert the different signal streams from different center frequencies.

15. A receiving device for receiving signals carrying data in a wireless communication system, comprising:
  at least two beam antennas, each beam antenna having a main beaming direction at a different angle so that via each beam antenna a different signal stream is received over a single-carrier wireless communication channel in the wireless communication system, wherein each respective different signal stream comprises a different version of the complete data transmitted;
  a combiner configured to combine the different signal streams received over the wireless communication channel via the different beam antennas into a single signal; and
  a space time block decoder configured to combine each different version of the data by using different respective decoding schemes and by using one of space time block decoding and space time trellis decoding.

16. A method for receiving signals carrying data in a wireless communication system, comprising:
  providing at least two beam antennas, each beam antenna having a main beaming direction at a different angle, wherein respective different signal streams comprise a different version of the complete data transmitted;
  receiving via each beam antenna over a single-carrier wireless communication channel a signal stream in the wireless communication system;
  combining respective received, cyclically shifted signal streams over the wireless communication channel via the different beam antennas into a single signal; and combining each different version of the data by using cyclic delay diversity.

17. The method according to claim 16, wherein the at least two beam antennas are overlapping.

18. The method according to claim 16, wherein the at least two beam antennas are not overlapping.

19. The method according to claim 16, wherein the different signal streams are downconverted from different center frequencies.

20. A method for receiving signals carrying data in a wireless communication system, comprising:
   providing at least two beam antennas, each beam antenna having a main beaming direction at a different angle, wherein respective different signal streams comprise a different version of the complete data transmitted;
   receiving via each beam antenna over a single-carrier wireless communication channel a signal stream in the wireless communication system;
   combining respective received signal streams over the wireless communication channel via the different beam antennas into a single signal; and
   combining each different version of the data by using different respective decoding schemes and by using one of space time block decoding and space time trellis decoding.

* * * * *